United States Patent [19]

Boatman

[11] Patent Number: 5,893,784
[45] Date of Patent: Apr. 13, 1999

[54] BEARING SUPPORT STRUCTURE FOR A TURRET IN MOORING SYSTEM AND METHOD FOR ITS INSTALLATION

[75] Inventor: L. Terry Boatman, Houston, Tex.

[73] Assignee: FMC Corporation, Chicago, Ill.

[21] Appl. No.: 08/870,247

[22] Filed: Jun. 6, 1997

Related U.S. Application Data

[60] Provisional application No. 60/019,595, Jun. 17, 1996.

[51] Int. Cl.[6] .................................................. B63B 21/50
[52] U.S. Cl. ............................................ 441/3; 114/230
[58] Field of Search .............................. 114/230, 293; 441/3–5

[56] References Cited

U.S. PATENT DOCUMENTS 4,305,341 12/1981 Stafford .
5,356,321 10/1994 Boatman et al. .

*Primary Examiner*—Ed L. Swinehart

[57] ABSTRACT

A bearing support structure is disclosed for a turret (10A) mounted for rotation within a well (50A) of a moored vessel. The bearing support structure has a turret bearing assembly (900A) which may tilt about a tilting axis (783A, FIG. 3) relative to a lower bearing support structure (764A) mounted on the vessel. The turret bearing assembly (760A) has a retainer ring (794A) below a peripheral slot (782A) in a turret ring (102A); a segmented key (596A) fits in slot (782A). The retainer ring (794A) is supported on an annular abutment (780A) on turret ring (102A). A filler material (781A) is provided in an annular space or clearance between turret ring (102A) and retainer ring (794A) to tighten the joint therebetween. A construction method is also disclosed for first placing a mooring turret in the well of the vessel and later installing a bearing assembly between the vessel and the turret by lowering it over the top of the turret.

11 Claims, 5 Drawing Sheets

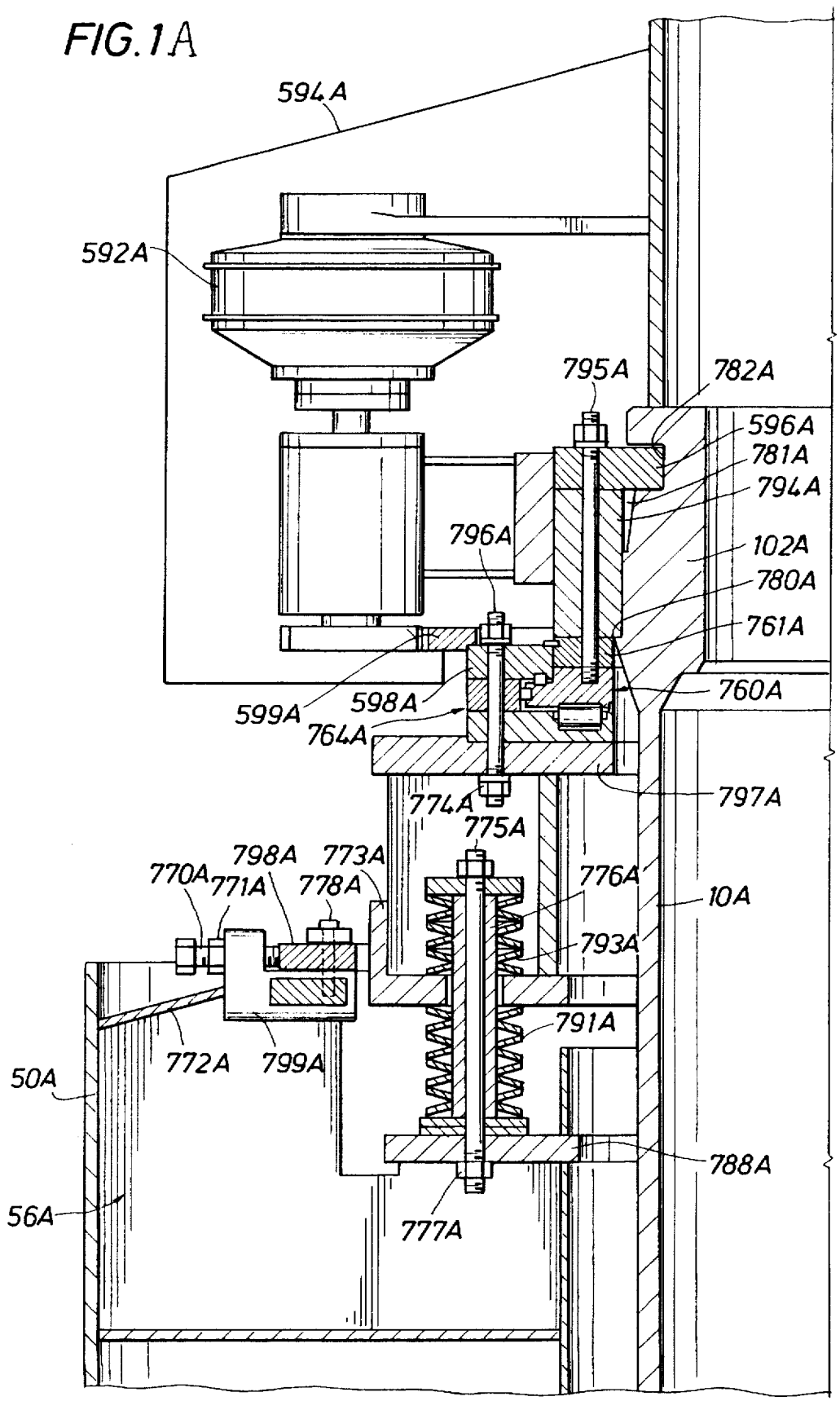

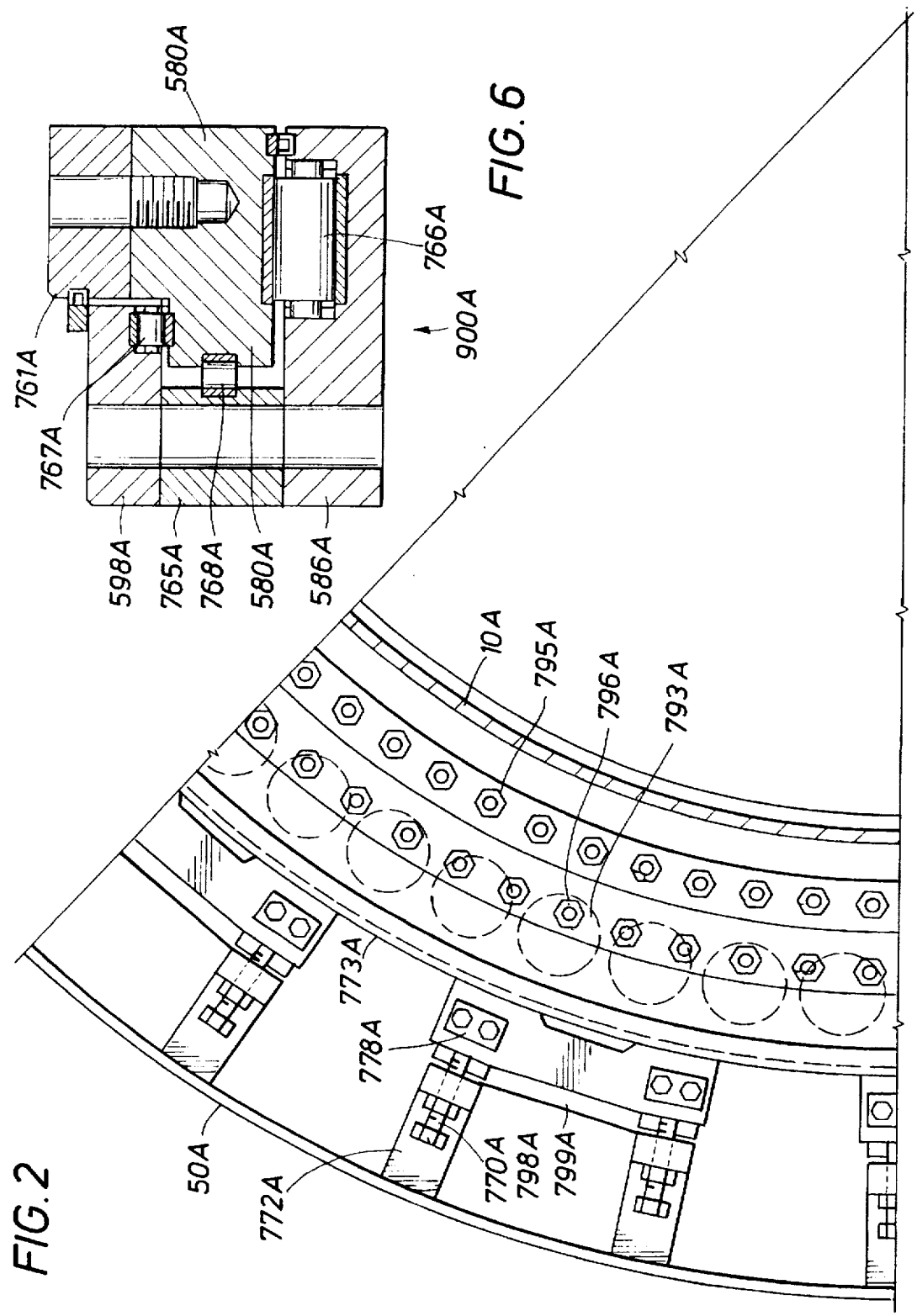

BEARING SUPPORT STRUCTURE FOR A TURRET IN MOORING SYSTEM AND METHOD FOR ITS INSTALLATION

CROSS-REFERENCE TO RELATED APPLICATION

This application claims the benefit of provisional application serial No. 60/019,595 filed Jun. 17, 1996 and entitled Bearing Support Structures For Turrets In Mooring Systems.

FIELD OF THE INVENTION

This invention relates generally to mooring systems, and more particularly to a bearing support structure for a turret on a vessel which weathervanes about the turret.

BACKGROUND OF THE INVENTION

As described in U.S. Pat. No. 5,356,321 dated Oct. 18, 1994, the entire disclosure being incorporated herein as a written description for all purposes, an upper bearing arrangement for a turret mounted for relative rotation within the well of a vessel is shown in FIGS. 5A and 5B and described in column 11, line 57 through column 12, line 60. The bearing structure has a pair of bearing races with roller bearings positioned between the bearing races. The lower or outer bearing race is secured to the vessel, and the upper or inner bearing race is secured to the turret. The turret may tilt relative to the vessel when a load deflection occurs where, for example, the turret mooring lines on only one side of the turret are under tension. Tilting between the upper and lower races results in an edge loading of the rollers between the races. Such a misalignment of the rollers results in undesirable uneven wear and reduced life of the bearing. Tilting forces on the turret are unavoidable. Nevertheless, it is highly desirable that any tilting action between the turret and vessel be limited.

The various components of a bearing structure for a turret are relatively massive components which require that substantial manufacturing tolerances be provided to assure fitting of the various components. Out of roundness of a component requires increased tolerances. As a result, some play usually exists between associated components. A solution to the problem of increased play between massive mechanical components is needed by the mooring system art.

Prior turret systems have mounted the turret onto the axial bearing after the bearing is in place in the well of a vessel. However, due to scheduling problems during construction, the bearing might not be available to a shipyard until a time later than the turret is available. Often it is desirable to install the turret immediately. A solution is needed to the problem of prior designs which require that an axial bearing be installed on a vessel prior to installation of the turret.

IDENTIFICATION OF OBJECTS OF THE INVENTION

An object of the invention is to provide a stiff upper bearing structure or joint for a turret mounted for relative relation in the well of a vessel to minimize relative tilting rotation of bearing components between the turret and body of the vessel.

Another object of the invention is to provide such a turret bearing structure having a pair of opposed bearing races with roller bearings therebetween that are maintained in alignment even with relative tilting rotation between the turret and vessel for minimizing wear of the roller bearings.

Another object of the invention is to provide a filler material for an annular clearance resulting from tolerances between the turret and a bearing retainer ring to stiffen the bearing structure.

Another object of the invention is to provide a bearing arrangement and a method for installing a turret in a well of a vessel followed by installing a bearing system over and around the cylindrical turret onto the vessel for rotatably coupling the turret and the vessel.

SUMMARY OF THE INVENTION

The present invention is an improvement over the upper bearing structure shown in FIGS. 5A and 5B of U.S. Pat. No. 5,356,321. A bearing support structure is provided in this invention for a turret assembly in which the turret assembly is rotatably coupled to the vessel by means of an axial bearing.

The present invention provides for stiffening an upper bearing joint between the turret and vessel and for resistance to such tilting rotation in order to limit the relative tilting rotation between opposed bearing races secured to the vessel and turret. The bearing structure includes a bearing assembly mounted on a bearing support ring secured to the vessel within the well of the vessel and has upper and lower bearing races with roller bearings between the races. The lower race is secured by suitable fasteners to the bearing support ring.

Mounting means are provided for mounting the upper bearing race to the turret in order substantially to minimize any rotational tilting between the upper and lower bearing races upon load deflection between the turret and vessel. The mounting means comprises an upper bearing retainer ring which extends about a vertical extension of the turret (called a turret ring). The retainer ring is positioned over the upper bearing race. The turret ring has a lower upwardly facing shoulder; the retainer ring is seated on the shoulder. An upper annular groove in the turret ring above the annular shoulder receives a segmented key which simultaneously fits over the retainer ring. The retainer ring has an upper end portion spaced radially from the turret ring to define an annular clearance space therebetween.

Filler material, such as epoxy grouting material, is positioned in the annular space to provide a tight fit. Fasteners, such as threaded studs, extend through the segmented key and the retainer ring and are threaded within internally threaded openings in the upper bearing race. During tightening of the fasteners, the segmented keys are radially inward against the bottom of the annular groove of the turret ring to remove radial clearance between the inside diameter of the keys and the outside diameter of the turret groove. Other fasteners are provided for rotational coupling of the upper bearing race to the lower bearing race while simultaneously securing the lower bearing race to the bearing support ring of the vessel. The thickness of the segmented keys is dimensioned to provide a near zero clearance above the key and below the annular shoulder of the turret ring.

The rotational center of the retainer ring and upper bearing race is located below the segmented key and above the annular shoulder on the turret ring. Such an arrangement stiffens the bearing joint. Any upward movement of the turret is reacted by the turret shoulder against the retainer ring and the fasteners.

The mounting arrangement of the invention of the invention allows the turret to be first installed in the well of the vessel, followed by lowering the axial bearing components downwardly and around the turret for subsequent securement of the upper bearing race to the turret, securement of the lower bearing race to the vessel and rotatable coupling of the upper and lower bearing races. Also the arrangement allows the removal of the bearing from the turret without removal of the turret from the vessel.

BRIEF DESCRIPTION OF THE DRAWINGS

The objects, advantages and features of the invention will become more apparent by reference to the drawings which are appended hereto and wherein an illustrative embodiment of the invention is shown, of which:

FIG. 1A is a sectional view of the upper bearing structure of FIG. 1 but further illustrating a hydraulic turret drive assembly for turning the vessel about the turret;

FIG. 2 is a top plan of the upper bearing structure shown in FIG. 1;

FIG. 6 is an illustration in cross section of a bearing assembly which is arranged to be lowered about an installed turret.

DESCRIPTION OF THE PREFERRED EMBODIMENT OF THE INVENTION

Figure 1:
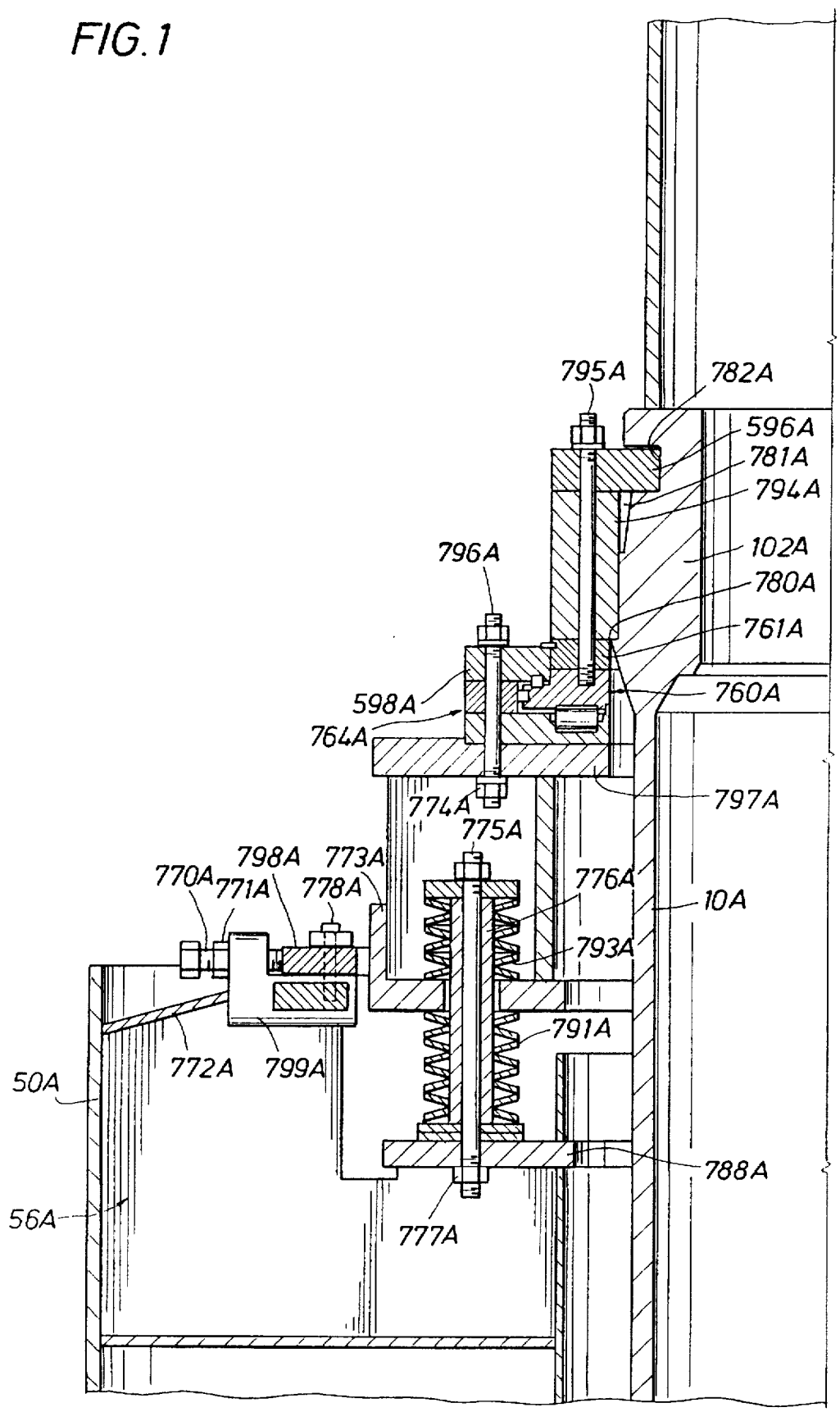
FIG. 1 is a sectional view of an upper bearing structure for a turret mounted within the well of a vessel and rotatably supported by the vessel.
Figure 3:
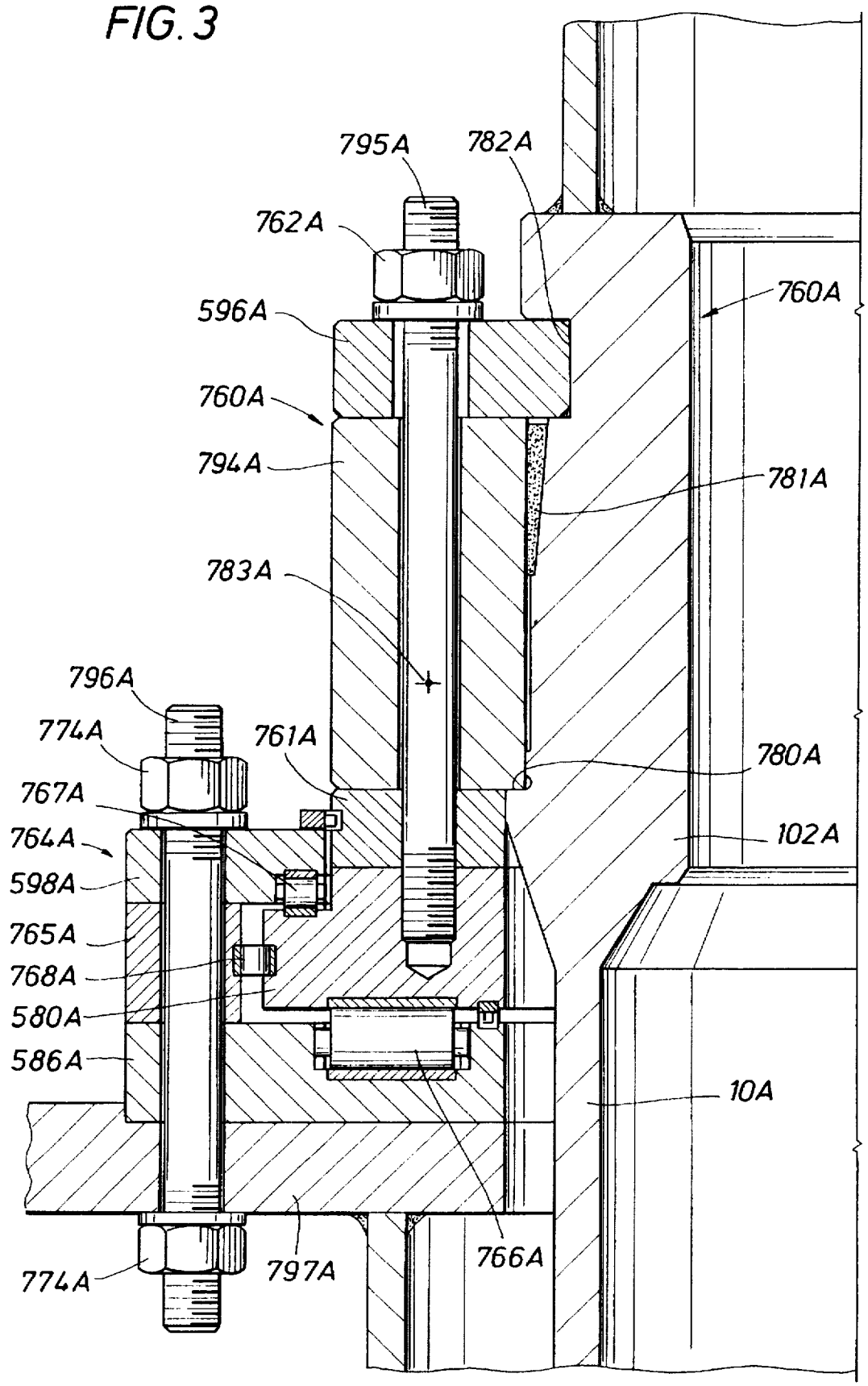
FIG. 3 is an enlarged view of a part of FIG. 1 showing the bearing assembly secured to the turret and including a pair of opposed bearing races with roller bearings therebetween.

Referring now to the drawings for a better understanding of this invention and more particularly to FIGS. 1–3, numerals similar to the numerals for FIGS. 5A and 5B of U.S. Pat. No. 5,356,321 are provided for similar elements with the addition of the letter "A".

A turret 10A is mounted within a well 50A defined by the body of the vessel. Turret 10A has a plurality of anchor lines (not shown) connected thereto which may be anchored to the sea floor. Turret 10A is not free to rotate substantially, because in operation after anchoring to the sea floor, it is substantially fixed to the sea floor. The vessel, including well 50A, may weathervane about turret 10A under the influence of weather, sea current and wave forces. An upper turret support structure is shown at 56A secured to well 50A and includes a horizontal bearing mounting plate 788A.

An upper bearing assembly 760A for turret 10A of this invention is supported on bearing support plate 788A. A support bracket 773A is provided for the turret upper bearing assembly 760A. Support bracket 773A may be moved radially inwardly a small amount during installation of turret 10A in the well 50A by means of adjustment stud 770A which is threaded within the base plate 799A. Adjustment stud 770A engages the outer side of alignment plate 798A which is carried by base plate 799A. Alignment plate 798A can be moved radially when stud 778A is not secured tightly to the base plate 799A via a threaded hole in plate 799A. The inner radial side of alignment plate 798A engages support bracket 773A. Nut 771A and the head of adjustment stud 770A are adjusted such that stud 770A is locked radially. Accordingly, support bracket 773A is radially supported by means of a plurality of alignment plates 798A mounted via support plates 772A about the annulus between well 50A and turret 10A. The movement or adjustment of support bracket 773A produces installation radial adjustment capability of turret bearing assembly 760A relative to well 50A and the vessel.

A bearing assembly ring 797A is secured (e.g., by welding) to bracket 773A. A lower spring stack 791A is placed between support bracket 773A and the bearing mount structure 788A. Accordingly, the entire outer portion of the thrust bearing assembly is resiliently mounted to the well 50A by means of the elements of the lower spring stack 791A placed about the annulus between well 50A and turret 10A. Lower spring stack 791A preferably includes disk springs or belleville washers to provide the resilient support between support bracket 773A and bearing mount structure 788A. Support bracket 773A is capable of limited radial movement with respect to stud 775A and nut 777A which fastens an upper spring stack 793A, support bracket 773A, lower spring stack 791A and bearing mount structure 788A together. Guides 776A are placed between the interior space of upper spring stack 793A, lower spring stack 791A and stud 775A.

The present invention is particularly directed to the bearing structure mounted on support ring 797A. If required by the circumstances and as illustrated in FIG. 1A, a hydraulic turret drive assembly 592A may be secured to turret 10A. A protective housing 594A may be provided for drive assembly 592A. Drive assembly 592A drives a segmented bull gear 599A for rotation of support ring 598A and the vessel 50A with respect to turret 10A.

Referring now to FIGS. 1 or 1A turret 10A has an upward extending, integral turret ring 102A. A segmented key 596A fits within a slot or opening 782A in the outer periphery of turret ring 102A. A retainer ring 794A has a lower end which engages shoulder 780A about the outer periphery of turret ring 102A. A spacer ring 761A is positioned between retainer ring 794A and an upper bearing race 580A. Studs 795A are threaded within upper bearing race 580A. Nuts 762A about stud 795A secure the upper bearing race 580A, space ring 761A, retainer ring 794A and segmented key 596A together. An epoxy grouting material 781A is positioned in a tapered groove or radial clearance space between the outer surface of turret ring 102A and the inner surface of retainer ring 794A. The grouting material aids in stiffening of turret bearing assembly 760A, especially in the case of improper installation of the segmented keys 596A resulting in the keys not being radially tight against the bottom of the grooves.

The axial bearing support structure for turret bearing assembly 760A is shown generally at 764A (please refer to FIG. 3) and includes a lower bearing support ring 797A having a vessel lower bearing race 586A positioned on top thereof. An upper thrust bearing ring 598A and side bearing ring 765A are stacked above lower bearing race 586A. Lower rollers 766A are positioned between turret bearing race 580A and vessel lower outer bearing race 586A. Upper rollers 767A are positioned between turret bearing race 580A and vessel thrust bearing ring 598A. Side rollers 768A are positioned between side bearing ring 765A and inner bearing race 580A. Suitable wear pads or hardened surfaces are provided for rollers 766A, 767A, and 768A. Studs 796A and nuts 774A are provided to sandwich vessel lower bearing race 586A, vessel side bearing ring 765A, and vessel upper thrust bearing ring 598A to lower bearing support ring 797A upon tightening of nuts 774A to provide the desired tensioning securement forces of the rotating components.

Referring again to FIG. 3, a point 783A is shown which is the effective point on a cross section of the combination of the turret/turret ring 10A/102A and turret bearing assembly 760A. In other words, if the turret 10A tilts clockwise in the plane of the paper shown in FIG. 3, the turret bearing assembly 760A tends also to rotate clockwise about point 783A due to the geometry and size of the turret 10A and the location of the shoulder 780A in which retainer ring 794A is supported.

The retainer ring 794A, positioned above shoulder 780A with segmented key 596A positioned in peripheral groove 782A of turret ring 102A, functions to stiffen the turret bearing assembly as compared to a design not providing a retainer ring 794A as illustrated. If the segmented key 596A were secured directly to the top of bearing inner race 580A, excessive tilt rotation would result of the bearing assembly 764A with respect to lower bearing race 586A. Furthermore, it is important that the segmented key 596A be positioned above the axis of rotation 783A and bearing race 580A to achieve proper stiffening. The retainer ring 596A is stiffened against tilting deflection because the segmented key 596A is positioned to contact the peripheral groove 782A of turret ring 102A. The grouting material 781A provides additional resistance to tilt rotation of retainer ring 594A and bearing race 580A. The large size of the peripheral groove 782A and segmented key 596A prevents the machining of zero radial clearance fits. The grouting 781A further provides filler for such clearance spaces and provides stiffening of the assembly.

Another advantage results from the arrangement of components as illustrated in FIG. 3. In the case of an uplift load on the turret 10A, shoulder 780A forces the upward load directly against retainer ring 794A and into the connecting bolts 795A. Because segmented key 596A is vertically spaced from shoulder 780A a prying action against ring 596A is obviated which would result if key 596A were closely fitted vertically to take the upward load. Thus large, expensive bolts are not required, but smaller ones 795A as illustrated in FIG. 3 may be provided. Enhanced function and reduced cost of the arrangement results.

Assembly of Turret Assembly and Bearing Support Structure

For certain turret-vessel systems, it is desirable for the turret/turret ring 10A/102A to be placed on top of the bearing structure, as shown in FIGS. 1 and 3, because of structural considerations inside the turret. If a simple flange were to be fabricated onto the turret to rest on the top side of the bearing inner race, (e.g. race 580A of FIG. 3), then during installation, the turret/turret ring 10A/102A must be lowered through the bearing assembly (e.g., assembly 764A). In many actual construction situations, scheduling conflicts require that the bearing assembly be available at the shipyard early in the project, if the turret is to be assembled onto the bearing assembly. Often that situation is not possible. The arrangement of this invention allows the turret to be first placed in the well of the vessel; the bearing assembly is installed later by lowering it around and over the top of the turret/turret ring.

Referring specifically to FIGS. 1 and 3, the bearing mounting structure 788A and the turret/turret ring 10A/102A are configured as illustrated in FIG. 1. Preferably a bearing assembly 900 (see FIG. 6) comprising bearing races 586A, 580A roller bearings 766A, 767A, 768A, spacer ring 761A, upper thrust bearing ring 598A and side bearing ring 765A is preassembled into an assembled unit 900 by a bearing manufacturer. Such assembly 900 is then lowered over the turret/turret ring 10A/102A and secured to lower bearing support ring 797A by means of bolts 796A and nuts 774A. Next, one piece retainer ring 794A is positioned and lowered over turret ring 102A with the bottom of retainer ring 794A engaging shoulder 780A on turret ring 102A. Epoxy grouting material 781A is then inserted in the tapered opening or groove formed between the outer peripheral surface of turret ring 102A and the opposed inner peripheral surface of retainer ring 794A.

After insertion of the epoxy grouting material 781A, segmented keys 596A are positioned within slot 782A about the periphery of turret ring 102A and are forced radially into light contact against turret ring 102A. Studs 795A are threaded within bearing race 580A. Nuts 762A are threaded, preferably by means of a hydraulic tensioner or wrench, onto studs 795A to provide a predetermined tension.

As indicated above, retainer ring 794A is effective to stiffen the turret assembly 760A by positioning segmented key 596A at a substantial distance above the center of rotation 783A. The epoxy grouting material 781A also provides resistance to tilting of the turret assembly 760A about the center of rotation at 783A. As a result of having retainer ring 794A abutting shoulder or abutment 780A, any upward load from turret ring 102A is reacted against by retainer ring 794A and bolts 795A which are threaded onto upper bearing race 580A while substantially preventing any prying action of ring 596A in peripheral groove 782A.

The arrangement is advantageous, because ring 102A of turret 10A need not be machined to make it have a perfectly zero radial clearance with ring 794A. The entire bearing assembly including preassembled assembly 900 (FIG. 6) and ring 794A and keys 596A provides radial and vertical support of turret/turret ring 10A/102A. During installation, each alignment plate 798A may be adjusted radially about the annulus between well 50A and turret 10A so as to provide snug radial support for the turret 10A as it rotates within well 50A with upper spring stack. Such adjustment is accomplished by releasing stud 770A and inner nut 771A, radially moving alignment plate 798A by means of adjustment stud 770A, and then screwing stud 770A into base plate tightly and turning nuts 771A until they are snug against base plate 799A.

Figure 4:
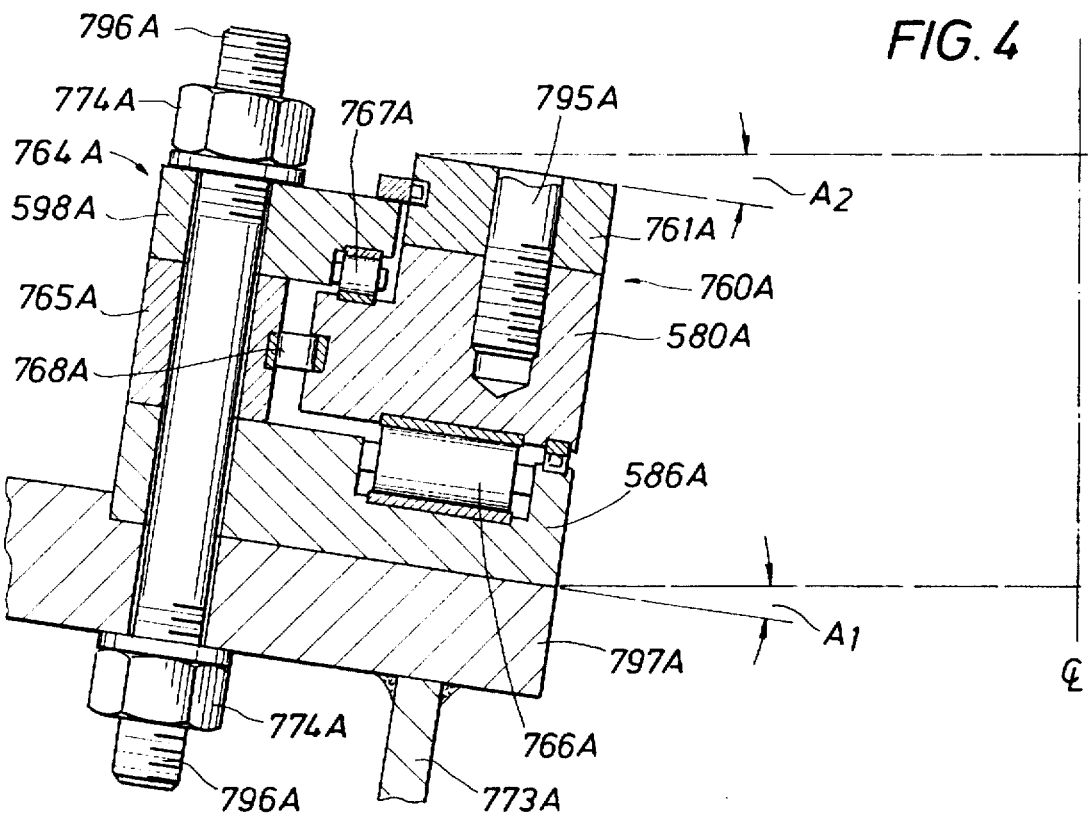
FIG. 4 is an exaggerated diagrammatic view showing tilting rotation of the turret with the opposed bearing races in alignment.

Referring to FIG. 4, an exaggerated illustration of tilting of the turret bearing assembly 760A of the turret 10A is shown. Because the retainer ring 794A and spacer ring 761A and bearing race 580A combination is relatively stiff when tightly clamped together by stud 795A and nut 762A, the tilt of the upper race 580A is substantially the same as that of lower bearing race 586A. This occurs because the dimensions of the various parts are sized to provide elastic matching of the rotational deflections. Referring to FIG. 1, the dimensions of the turret/turret ring 10A/102A and the dimensions of an upper combination of components including keys 596A, ring 794A, spacer ring 761A and upper bearing assembly 760A are selected to be elastically matched, because such turret/turret ring and such combination rotate approximately through the same angle with relative tilting rotation between the turret and the vessel. Next, the dimensions of a lower combination of components including the vessel lower bearing race 516A, side bearing ring 765A, upper thrust bearing ring 598A, lower bearing support ring 797A and support bracket 773A are determined so that rotation of the lower combination is as close to the rotation of the upper combination and turret/turret ring as possible, while considering the various combinations of vertical and radial load. In this way edge loading of rollers 766A on the upper bearing race 580A is minimized. As a result, the roller bearing 766A wears substantially equally along its axial width within the upper and lower bearing races with consequences of increased bearing life and of decreased wear and maintenance expense.

Figure 5:
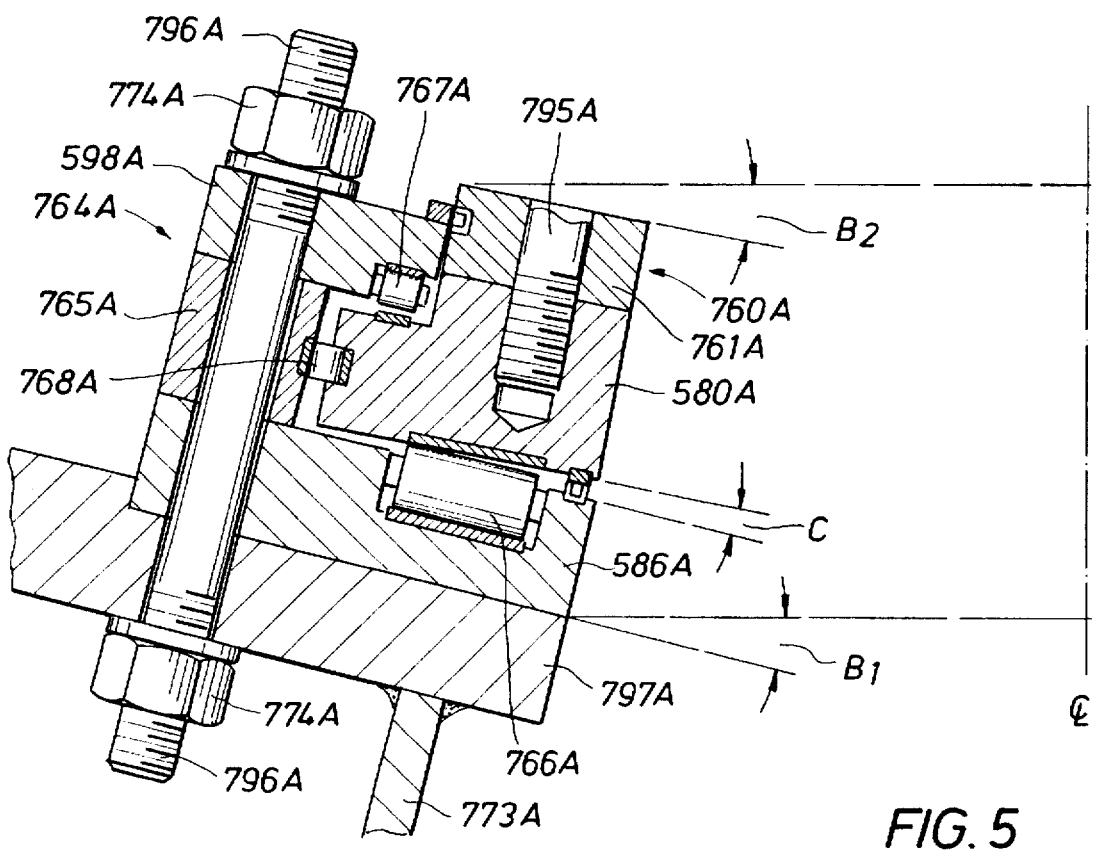
FIG. 5 is a diagrammatic view similar to FIG. 4 but showing an exaggerated view of the bearing races misaligned with the upper bearing race supported on an edge of the roller bearings.

FIG. 5 presents an exaggerated illustration of tilting of the turret bearing assembly 760A where the retainer ring 794A, spacer ring 761A is not stiffened as described above. If the retainer ring 794A, spacer ring 761A combination is not stiffened, the tilt of the upper race 580A is greater than that of the lower bearing race 586A. As a result, an angle C develops between the upper bearing race 580A and roller bearing 766A which causes edge loading on the support rollers with consequences of increased wear and maintenance expense.

In summary, a bearing support structure 760A for a turret/turret ring assembly 10A, 102A is provided which minimizes tilting of the turret assembly with respect to the bearing support structure, thereby minimizing wear on the bearing elements. Further, a new method of assembling a turret and a bearing assembly is provided by first installing a turret in a well of the vessel and later installing a preassembled bearing support structure by lowering it over the upper end of the turret and landing the bearing structure on a shoulder of the turret. Fasteners and a segmented ring secure the upper part of the bearing structure to the turret while other fasteners secure the lower part of the bearing structure to the vessel.

Various modifications and alterations in the described apparatus will be apparent to those skilled in the art of the foregoing description which does not depart from the spirit of the invention. For this reason, such changes are desired to be included in the appended claims. The appended claims recite the only limitations of the present invention, and the descriptive manner which is employed for setting forth the embodiments is to be interpreted as illustrative and not limitative.

What is claimed is:

1. A bearing support structure for a turret (102) mounted in a vertical well (50A) of a vessel for relative rotation of said vessel about said turret (102), having a generally cylindrical outer housing (10A) and a turret ring (102A) extending above said outer housing; said bearing support structure comprising:

a bearing support ring (797A) secured to said vessel within said well;

a bearing assembly (900A) mounted on said support ring including upper (580A) and lower (586A) bearing races having roller bearings (766A) therebetween, and an upper thrust bearing ring (598A) for maintaining said bearing races in position;

fasteners (796A) securing said upper thrust bearing ring (580A) and said lower bearing race (586A) to said bearing support ring (797A);

a retainer ring (794A) disposed above said bearing assembly (764A) and extending about said turret ring (102A), said turret ring having a lower outer upwardly facing shoulder 780A thereon with said retainer ring (794A) abutting said lower shoulder;

a peripheral slot (782A) disposed in said turret ring above said retainer ring;

a segmented annular key (596A) disposed above said retainer ring and disposed in said peripheral slot (782A) of said turret ring (102A); and fastener means 795A extending through said segmented annular key (596A) and said retainer ring (794A) and secured to said upper bearing race (580A), said fasteners upon tensioning thereof effecting securement of said upper bearing race (580A) to said turret (10A, 102A) while minimizing tilt of said upper bearings race (580A) with respect to the said lower bearing race (586A) when tilting forces are applied to said turret (10A).

2. A bearing support structure of claim 1 wherein:

said retainer ring (794A) has an upper end portion spaced radially from said turret ring (102A) to define an annular space therebetween to allow for radial clearance between said retainer ring and said turret ring (102A); and a filler material (781A) and adjustable segmented keys positioned in said annular space to minimize radial movement between said retainer ring (794A) and said turret ring (102A).

3. A bearing support structure of claim 1 wherein:

said peripheral slot (782A) in said turret ring (102A) and said segmented key (596A) within said peripheral slot (782A) are positioned at a location above a tilting axis of said turret (10A, 102A) relative to said vessel.

4. The bearing structure of claim 1 wherein:

said retainer ring (794A), said spacer ring (761A) and said bearing assembly (900A) are sized and arranged to provide elastic matching of rotational deflections of said retainer ring (794A) said spacer ring (761A) and said bearing assembly, whereby separation of said upper (580A) and lower (586A) bearing races of said bearing assembly (900A) is inhibited when said turret tilts relative to said vessel.

5. In a vessel mooring system for a vessel having a vertical well (50A) which is open to the sea and having a substantially vertically aligned turret rotatably secured to the vessel within the well such that said vessel may rotate with respect to said turret when a plurality of mooring lines anchor the turret to a sea floor, said turret (10A) having a generally cylindrical outer housing and a turret ring (102A) extending upwardly of said turret; an improved bearing support structure for the turret comprising:

a bearing support ring (797A) secured to said vessel within said well;

a bearing assembly (900A) mounted on said support ring (797A) including upper (580A) and lower (586A) bearing races having roller bearing members (766A) disposed therebetween;

first fasteners (796A) securing said lower bearing race (586A) to said support ring (797A); and mounting means for securing said upper bearing race (580A) on said turret (10A, 102A) to minimize relative tilting movement between said upper (580A) and lower (586A) bearing races when tilting forces are applied to said turret (10A) with respect to said vessel;

said mounting means comprising:

a bearing retainer ring (794A) extending outwardly about said turret ring (102A), said turret ring (102A) having a lower upwardly facing outer shoulder (780A) thereon and an upper peripheral groove (782A) disposed at a distance above said shoulder (780A);

a segmented key (596A) mounted within said upper peripheral groove and disposed above said bearing retainer ring (794A); and second fasteners (795A) extending through said segmented key (596A) and said bearing retainer ring (794A) and fitting within an internally threaded opening of said upper bearing race (580A), said additional fasteners upon tightening thereof securing said turret (10A, 102A) to said upper bearing race (580A) by trapping said retainer ring (794A) and said segmented key (596A) between said shoulder (780A) and said groove (782A) of said turret (10A, 102A).

6. The improved bearing support structure of claim 5 wherein:

said bearing retainer ring (794A) has an upper end portion spaced radially from said turret ring (102A) to define an annular space therebetween; and a filler material (781A) is positioned in said annular space to minimize radial movement between said retainer ring (794A) and said turret ring (102A).

7. The structure of claim 5 wherein:

said peripheral groove (782A) in said turret ring (102A) and said segmented key (596A) within said peripheral groove (782A) are positioned at a location above the tilting axis (783A) of said upper race (580A) and retainer ring (794A), where said tilting axis is defined as that axis about which said turret (10A) tends to tilt with respect to said bearing support ring (797A) when tilting forces are applied to said turret or to said vessel.

8. The structure of claim 7 wherein:

said upwardly facing outer shoulder (780A) on said turret ring (102A) is positioned below said tilting axis (783A) of said upper race (581A) and retainer ring (794A) upon relative tilting movement between said turret (10A) and said bearing support ring (797A).

9. The structure of claim 6 further comprising:

an upper thrust bearing race (598A) positioned over said upper bearing race (580A) with said first fasteners also securing said upper thrust bearing race (598A) to said bearing support ring (797A), and a thrust bearing (767A) positioned between said upper thrust bearing race (598A) and said upper bearing race (580A).

10. A method for installing a turret (10A/102A) and a bearing assembly (900A) in a well (50A) of a vessel, the turret (10A/102A) including an upper peripheral groove (782A) and a lower ring supporting surface (780A), said method comprising the steps of first securing a bearing support ring (797A) to the vessel in said well, placing said turret within said bearing support ring, next, lowering a bearing assembly (900A) downwardly about said turret, where said bearing assembly (900A) includes a lower bearing race (586A) and an upper bearing race (580A), landing a ring (794A) on said lower ring supporting surface (780A), inserting a segmented key (596A) within said upper groove (782A) above said ring (794A), and fastening said ring (794A) and segmented key (596A) to said bearing assembly (900A) and to said turret (10A/102A).

11. The method of claim 10 wherein, said segmented key (782A) is inserted within said peripheral groove (782A) at a position above the tilting axis (783A) of said upper bearing race (580A) with respect to said lower bearing race (586A).

* * * * *